United States Patent
Iwabuchi

(10) Patent No.: US 10,163,039 B2
(45) Date of Patent: Dec. 25, 2018

(54) INFORMATION PROCESSING APPARATUS, METHOD FOR PROCESSING INFORMATION, AND RECORDING MEDIUM

(71) Applicant: CANON KABUSHIKI KAISHA, Tokyo (JP)

(72) Inventor: Kohei Iwabuchi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 162 days.

(21) Appl. No.: 15/272,032

(22) Filed: Sep. 21, 2016

(65) Prior Publication Data

US 2017/0091592 A1 Mar. 30, 2017

(30) Foreign Application Priority Data

Sep. 24, 2015 (JP) ................. 2015-186716

(51) Int. Cl.
  *H04N 7/18* (2006.01)
  *H04N 9/47* (2006.01)
  *G06K 9/62* (2006.01)
  *G06K 9/46* (2006.01)

(52) U.S. Cl.
  CPC ............ *G06K 9/6267* (2013.01); *G06K 9/46* (2013.01); *G06K 9/6218* (2013.01); *G06K 2009/4666* (2013.01); *G06T 2207/20076* (2013.01)

(58) Field of Classification Search
  None
  See application file for complete search history.

(56) References Cited

U.S. PATENT DOCUMENTS

| | | | |
|---|---|---|---|
| 9,697,423 B1* | 7/2017 | Bellert | G06K 9/00456 |
| 2013/0064460 A1* | 3/2013 | Zhang | G06K 9/00677 |
| | | | 382/225 |
| 2013/0117692 A1* | 5/2013 | Padmanabhan | H04N 21/4126 |
| | | | 715/753 |
| 2016/0042253 A1* | 2/2016 | Sawhney | G06K 9/6255 |
| | | | 382/190 |
| 2017/0357878 A1* | 12/2017 | Sawhney | G06K 9/6255 |
| 2018/0046855 A1* | 2/2018 | Ganong | G06F 17/30247 |

FOREIGN PATENT DOCUMENTS

| | | |
|---|---|---|
| JP | 2007-312058 A | 11/2007 |
| JP | 2012-044646 A | 3/2012 |

* cited by examiner

*Primary Examiner* — Talha M Nawaz
(74) *Attorney, Agent, or Firm* — Canon U.S.A., Inc. IP Division

(57) ABSTRACT

An information processing apparatus includes a set specifying unit, a clustering unit, an image selection unit, and an image arrangement unit. The set specifying unit specifies a set of images from among a plurality of images under a predetermined condition. The clustering unit classifies, after the set of images is specified by the set specifying unit, the plurality of images into any of the same number of clusters as that of image layout regions. The image selection unit collectively selects images that constitute the set of images from among the images included in the clusters generated by the clustering unit. The image arrangement unit arranges, in the image layout regions that correspond to the clusters one-to-one, the images constituting the set of images selected from the clusters by the image selection unit.

12 Claims, 18 Drawing Sheets

FIG. 3A

| | | | | | 30 |
|---|---|---|---|---|---|
| IMAGE ID | IMAGE NAME | SET LABEL | PHOTOGRAPHING DATE/TIME | PHOTOGRAPHING LOCATION | COLOR AVERAGE VALUE | FACE TAG |
| | | 301 | 302 | 303 | 304 | 305 |
| 1 | IMG_001.jpg | | 2014/07/25 09:51:02 | (36.3573, 139.4624) | (96, 74, 123) | BECKY, CAROL |
| 2 | IMG_002.jpg | | 2014/07/25 10:11:42 | (36.3492, 139.4586) | (62, 136, 74) | ADA, BECKY, CAROL, DOROTHY |
| 3 | IMG_003.jpg | | 2014/07/25 10:37:28 | (36.3572, 139.4628) | (96, 78, 119) | ADA, CAROL, ELENA |
| 4 | IMG_004.jpg | | 2014/07/25 11:01:31 | (36.3570, 139.4629) | (94, 75, 120) | DOROTHY, ELENA |
| 5 | IMG_005.jpg | | 2014/07/25 11:37:28 | (36.3326, 139.4687) | (112, 232, 148) | ADA, DOROTHY |
| ... | ... | ... | ... | ... | ... | ... |
| 74 | IMG_074.jpg | | 2014/07/25 19:28:43 | (36.3326, 139.4687) | (107, 219, 141) | BECKY, DOROTHY |
| 75 | IMG_075.jpg | | 2014/07/25 19:52:17 | (36.3492, 139.4586) | (59, 151, 71) | ADA, BECKY, CAROL, DOROTHY |

| | IMAGE ID | IMAGE NAME | SET LABEL | PHOTOGRAPHING DATE/TIME | PHOTOGRAPHING LOCATION | COLOR AVERAGE VALUE | FACE TAG |
|---|---|---|---|---|---|---|---|
| 306 | 1 | IMG_001.jpg | color_unification_01 | 2014/07/25 09:51:02 | (36.3573, 139.4624) | (96, 74, 123) | BECKY, CAROL |
| 307 | 2 | IMG_002.jpg | | 2014/07/25 10:11:42 | (36.3492, 139.4586) | (62, 136, 74) | ADA, BECKY, CAROL, DOROTHY |
| 308 | 3 | IMG_003.jpg | color_unification_01 | 2014/07/25 10:37:28 | (36.3572, 139.4628) | (96, 78, 119) | ADA, CAROL, ELENA |
| 309 | 4 | IMG_004.jpg | color_unification_01 | 2014/07/25 11:01:31 | (36.3570, 139.4629) | (94, 75, 120) | DOROTHY, ELENA |
| | 5 | IMG_005.jpg | | 2014/07/25 11:37:28 | (36.3326, 139.4687) | (112, 232, 148) | ADA, DOROTHY |
| | ... | ... | ... | ... | ... | ... | ... |
| | 74 | IMG_074.jpg | | 2014/07/25 19:28:43 | (36.3326, 139.4687) | (107, 219, 141) | BECKY, DOROTHY |
| 310 | 75 | IMG_075.jpg | | 2014/07/25 19:52:17 | (36.3492, 139.4586) | (59, 151, 71) | ADA, BECKY, CAROL, DOROTHY |

| IMAGE ID | IMAGE NAME | SET LABEL | PHOTOGRAPHING DATE/TIME | PHOTOGRAPHING LOCATION | COLOR AVERAGE VALUE | FACE TAG |
|---|---|---|---|---|---|---|
| ... | | ... | | | ... | |

FIG. 4

| CONDITION ID | SET LABEL | SET SPECIFYING CONDITIONS |
|---|---|---|
| 1 | color_unification | PHOTOGRAPHING LOCATIONS ARE WITHIN PREDETERMINED RANGE AND SIMILARITY OF COLOR AVERAGE VALUES ARE EQUAL TO OR GREATER THAN THRESHOLD |
| 2 | time_contrast | PHOTOGRAPHING LOCATIONS ARE WITHIN PREDETERMINED RANGE, THE SAME PERSON IS PHOTOGRAPHED, AND PHOTOGRAPHING DATES/TIME ARE WITH INTERVAL EQUAL TO OR GREATER THAN THRESHOLD |
| ⋮ | ⋮ | ⋮ |

FIG. 13A

| IMAGE ID | IMAGE NAME | LABEL | PHOTOGRAPHING DATE/TIME | PHOTOGRAPHING LOCATION | COLOR AVERAGE VALUE | FACE TAG | IMPORTANT IMAGE FLAG |
|---|---|---|---|---|---|---|---|
| 1 | IMG_101.jpg |  | 2004/07/25 09:51:02 | (36.3573, 139.4624) | (96, 74, 123) | BECKY, CAROL |  |
| 2 | IMG_102.jpg |  | 2004/07/25 13:11:42 | (36.3492, 139.4586) | (62, 136, 74) | ADA, BECKY, CAROL, DOROTHY | 1 |
| 3 | IMG_103.jpg |  | 2004/07/25 15:37:28 | (36.3572, 139.4628) | (96, 78, 119) | ADA, CAROL, ELENA |  |
| 4 | IMG_104.jpg |  | 2004/07/25 16:01:31 | (36.3570, 139.4629) | (94, 75, 120) | DOROTHY, ELENA |  |
| 5 | IMG_105.jpg |  | 2004/07/25 17:37:28 | (36.3326, 139.4687) | (112, 232, 148) | ADA, DOROTHY | 1 |
| ... | ... | ... | ... | ... | ... | ... | ... |
| 79 | IMG_179.jpg |  | 2014/07/28 13:28:43 | (36.3326, 139.4687) | (107, 219, 141) | BECKY, DOROTHY | 1 |
| 80 | IMG_180.jpg |  | 2014/07/28 13:52:17 | (36.3492, 139.4586) | (59, 151, 71) | ADA, BECKY, CAROL, DOROTHY |  |

FIG. 13B

| | IMAGE ID | IMAGE NAME | LABEL | PHOTOGRAPHING DATE/TIME | PHOTOGRAPHING LOCATION | COLOR AVERAGE VALUE | FACE TAG | IMPORTANT IMAGE FLAG |
|---|---|---|---|---|---|---|---|---|
| | | | 301 | 302 | 303 | 304 | 305 | 130 / 1306 |
| 1301 | 1 | IMG_101.jpg | color_unification_01 | 2004/07/25 09:51:02 | (36.3573, 139.4624) | (96, 74, 123) | BECKY, CAROL | |
| 1302 | 2 | IMG_102.jpg | time_contrast_01 | 2004/07/25 13:11:42 | (36.3492, 139.4586) | (62, 136, 74) | ADA, BECKY, CAROL, DOROTHY | 1 |
| 1303 | 3 | IMG_103.jpg | color_unification_01 | 2004/07/25 15:37:28 | (36.3572, 139.4628) | (96, 78, 119) | ADA, CAROL, ELENA | |
| 1304 | 4 | IMG_104.jpg | color_unification_01 | 2004/07/25 16:01:31 | (36.3570, 139.4629) | (94, 75, 120) | DOROTHY, ELENA | 1 |
| | 5 | IMG_105.jpg | | 2004/07/25 17:37:28 | (36.3326, 139.4687) | (112, 232, 148) | ADA, DOROTHY | |
| | ... | ... | ... | ... | ... | ... | ... | ... |
| | 79 | IMG_179.jpg | | 2014/07/28 13:28:43 | (36.3326, 139.4687) | (107, 219, 141) | BECKY, DOROTHY | 1 |
| 1305 | 80 | IMG_180.jpg | time_contrast_01 | 2014/07/28 13:52:17 | (36.3492, 139.4586) | (59, 151, 71) | ADA, BECKY, CAROL, DOROTHY | |

FIG. 13C

| IMAGE ID | IMAGE NAME | LABEL | PHOTOGRAPHING DATE/TIME | PHOTOGRAPHING LOCATION | COLOR AVERAGE VALUE | FACE TAG | IMPORTANT IMAGE FLAG |
|---|---|---|---|---|---|---|---|
| | | 301 | 302 | 303 | 304 | 305 | 130 / 1306 |
| ... | ... | ... | ... | ... | ... | ... | ... |

INFORMATION PROCESSING APPARATUS, METHOD FOR PROCESSING INFORMATION, AND RECORDING MEDIUM

BACKGROUND OF THE INVENTION

Field of the Invention

Embodiments of the present invention relate to an information processing apparatus, a method for processing information, and a recording medium.

Description of the Related Art

As digital cameras and smartphones are becoming increasingly popular recently, users take photographs much more frequently than before. Businesses to create commercial materials, such as photo books and slide shows, are becoming popular among these users to make good use of the photographed pictures.

In creating such a commercial material, selecting and arranging images at random are unusual. The images to be used for the commercial material are usually selected and arranged with a certain intention. It is possible to provide the commercial material with feeling of uniformity or plots by combining the images to express the user's intention.

In this case, specifying a set of images with editing intention of the user and collectively arranging the images in an image layout region of the commercial material are desirable.

Japanese Patent Laid-Open No. 2007-312058 discloses setting conditions of images to be arranged in layout frames of a template having one or more layout frames in which the images are arranged. In the technique described in Japanese Patent Laid-Open No. 2007-312058, a set of images may be specified by setting a series of conditions on the basis of editing intention for each layout frame.

Japanese Patent Laid-Open No. 2012-44646 discloses dividing input moving images and still images into groups on the basis of information, such as photographed time, specifying a set of images in the groups, and determining a layout of the specified set of images.

In the techniques described in Japanese Patent Laid-Open No. 2007-312058 and No. 2012-44646, editing intention of the user can be expressed as sets of images whereas the set of images cannot be selected or arranged collectively. Further, all the considered sets of images cannot be taken as selection targets. Therefore, there is a possibility that the user's intention is not fully expressed even if any sets of images are arranged collectively in the image layout region.

In the technique described in Japanese Patent Laid-Open No. 2007-312058, the layout frames are independent from each other. Therefore, images are not necessarily arranged as user's intention in all of the layout frames under a series of conditions. For example, if two blue-tinted images are included in input images and there are three layout frames in a template, the blue-tinted images are arranged in two of the three layout frames. In this case, in the technique described in Japanese Patent Laid-Open No. 2007-312058, an image with user-intended tint is not necessarily arranged in the rest of the layout frames.

In the technique described in Japanese Patent Laid-Open No. 2012-44646, a set of images is specified after images are divided into groups. A division point at which the input images is divided into a plurality of groups is determined depending simply on, for example, photographing intervals. Therefore, there is a possibility that a set of images intended by a user is not acquired.

SUMMARY OF THE INVENTION

For example, the following configuration is provided to collectively arrange a set of images intended by a user in an image layout region.

According to an aspect of the present invention, an information processing apparatus includes a set specifying unit configured to specify a set of images from among a plurality of images under a predetermined condition, a clustering unit configured to classify, after the set of images is specified by the set specifying unit, the plurality of images into any of the same number of clusters as that of image layout regions, an image selection unit configured to collectively select images that constitute the set of images from among the images included in the clusters generated by the clustering unit, and an image arrangement unit configured to arrange, in the image layout regions that correspond to the clusters one-to-one, the images constituting the set of images selected from the clusters by the image selection unit.

Further features of the present invention will become apparent from the following description of exemplary embodiments with reference to the attached drawings.

BRIEF DESCRIPTION OF THE DRAWINGS

FIGS. 3A to 3C are diagrams illustrating a first example of a configuration of an image information management table.

FIG. 4 is a diagram illustrating a configuration of a set specifying conditions management table.

FIGS. 13A to 13C are diagrams illustrating a second example of a configuration of an image information management table.

DESCRIPTION OF THE EMBODIMENTS

Hereafter, embodiments are described with reference to the drawings. Configurations in the following embodiments are illustrative only, and the present invention is not limited to the same.

First Embodiment

Figure 1:
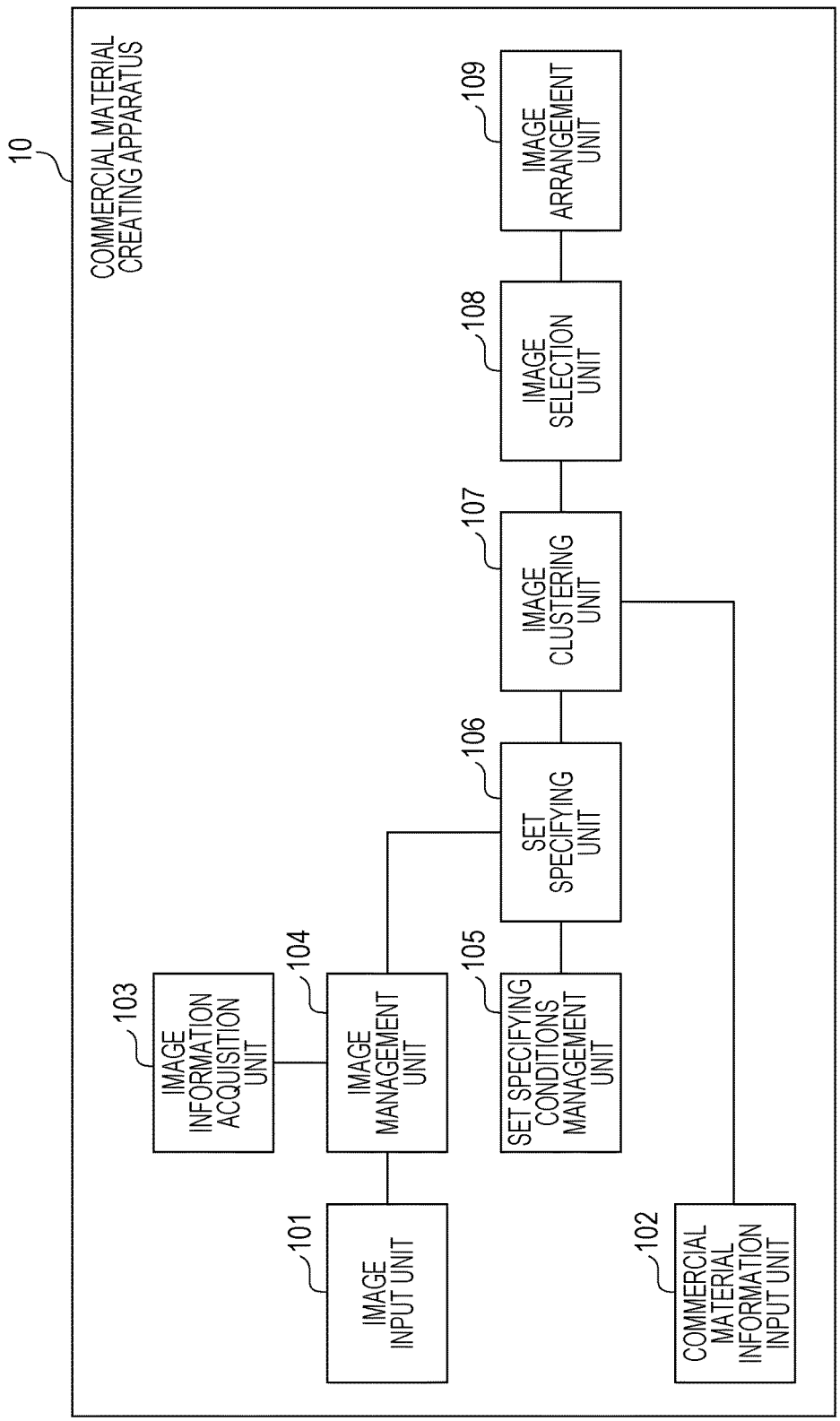
FIG. 1 is a diagram illustrating a first example of a functional configuration of a commercial material creating apparatus.

FIG. 1 is a block diagram illustrating an example of a functional configuration of a commercial material creating apparatus (an information processing apparatus) 10. In the present embodiment, a photo book is created as an example of a commercial material. The commercial material creating apparatus is an example of an information processing apparatus. The present invention is applicable to various other apparatuses. For example, the present invention is applicable to an apparatus used to create an electronic album.

An image input unit 101 inputs images designated by a user, and stores the images in an image management unit 104. The images may be input in the image input unit 101 via a storage medium, such as a CD and a DVD, or a network, such as the Internet. The image management unit 104 includes an image storage unit which stores the images input in the image input unit 101, and an image information management table 30 illustrated in FIGS. 3A to 3C. Details of the image information management table 30 are described later.

An image information acquisition unit 103 acquires metadata, such as photographing date/time and photographing location, included in each image, and image information, such as a color average value, regarding the images stored in the image management unit 104. The image information acquired by the image information acquisition unit 103 is associated mutually with an image, which is an acquisition source, and is managed by the image information management table 30.

A commercial material information input unit 102 inputs information about the commercial material input by the user. Information about the commercial material includes, for example, the type of the commercial material, such as a photo book and a slide show, the number of pages of the commercial material, and the upper limit of the number of images per page. The commercial material information input unit 102 may input a configuration file describing information about the commercial material in advance.

A set specifying conditions management unit 105 manages predetermined conditions for specifying a set of images in a set specifying conditions management table 40 illustrated in FIG. 4. Details of the set specifying conditions management table 40 are described later. Hereafter, "conditions for specifying a set of images" will be referred to as "set specifying conditions" as needed. The user may add set specifying conditions later by adding set specifying conditions designated by the user to the set specifying conditions management table 40.

A set specifying unit 106 specifies a set of images consisting of two or more images from among the images stored in the image management unit 104 using the set specifying conditions managed by the set specifying conditions management table 40, and applies the same set label to the images included in the specified set of images. Details of the set label are described later with reference to FIGS. 3A to 3C.

An image clustering unit 107 classifies the input images into clusters so that the number of pages input by the commercial material information input unit 102 and the number of clusters are the same, and groups any of the images input by the image input unit 101 into any of the plurality of clusters.

An image selection unit 108 selects one or more images used for the commercial material from each cluster generated by the image clustering unit 107. An image arrangement unit 109 arranges the images selected by the image selection unit 108 in each page. The commercial material is thus created.

Figure 2:
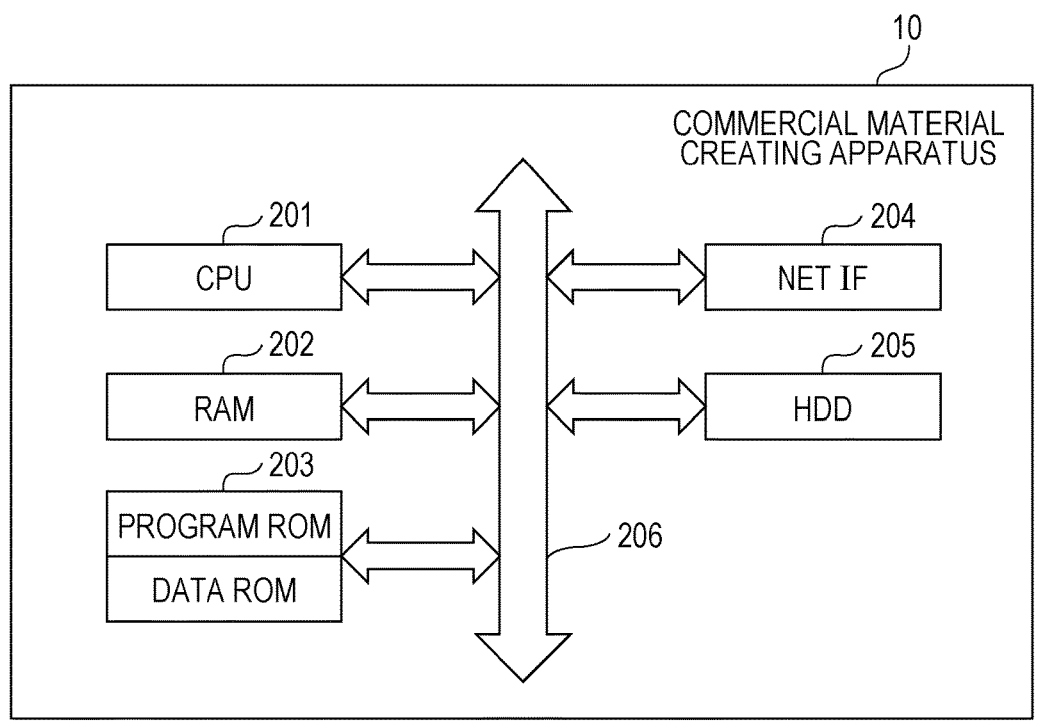
FIG. 2 is a diagram illustrating a hardware configuration of the commercial material creating apparatus.

FIG. 2 is a diagram illustrating an example of a hardware configuration of the commercial material creating apparatus 10.

A central processing unit (CPU) 201 controls a computer system. The CPU 201 implements each functional configuration and process described later by executing calculation and processing of information, and control of hardware on the basis of a control program. Random-access memory (RAM) 202 functions as main memory of the CPU 201 and as work memory necessary for loading an execution program and for executing a program.

Read only memory (ROM) 203 records a control program which defines an operation processing procedure of the CPU 201. The ROM 203 includes program ROM recording an operating system (OS) which is a system program performing appliance control of the computer system, and data ROM recording information and the like necessary for the operation of the system. A hard disk drive (HDD) 205 described below may be used instead of the ROM 203.

A network interface (NET IF) 204 performs input/output control of data transmitted and received via a network. The HDD 205 is used to store data, such as an application program. An input/output bus 206 is used to mutually connect each unit described above. The input/output bus 206 has, for example, an address bus, a data bus, and a control bus.

FIGS. 3A to 3C are diagrams illustrating an example of a configuration of the image information management table 30. The image information management table 30 is a table storing various types of information, such as image ID, image name, set label, photographing date/time, photographing location, color average value, and face tag in a mutually associated manner.

The set label is stored in a set label column 301. The set label is used to specify a set of images. Image groups having a common set label is treated as a single set of images. In FIG. 3B, the number 01 added to the end the set label represents that a unique set label has been applied to each set of images if a plurality of sets of images are generated under the same set specifying condition. In the example illustrated in FIG. 3B, three images of which image IDs are 1, 3 and 4 are included in the same set of images. In a face tag column 305, a character string with which each person appearing in the image can be uniquely specified is stored. In a color average value column 304, average values of R, G and B of each image are stored as color average values.

FIG. 4 is a diagram illustrating an example of a configuration of the set specifying conditions management table 40. The set specifying conditions management table 40 is a table which manages conditions (set specifying conditions) for specifying a set of images. The set specifying conditions management table 40 is a table storing condition ID, set label, and set specifying conditions in a mutually associated manner.

In a set label column 401, character strings provided in common to images included in a set of images specified under a corresponding set specifying condition, which are character strings inherent in each set specifying condition, are stored. In a set specifying condition column 402, specific conditions for specifying the set of images (i.e., specific content of the set specifying conditions) are stored.

Figure 5:
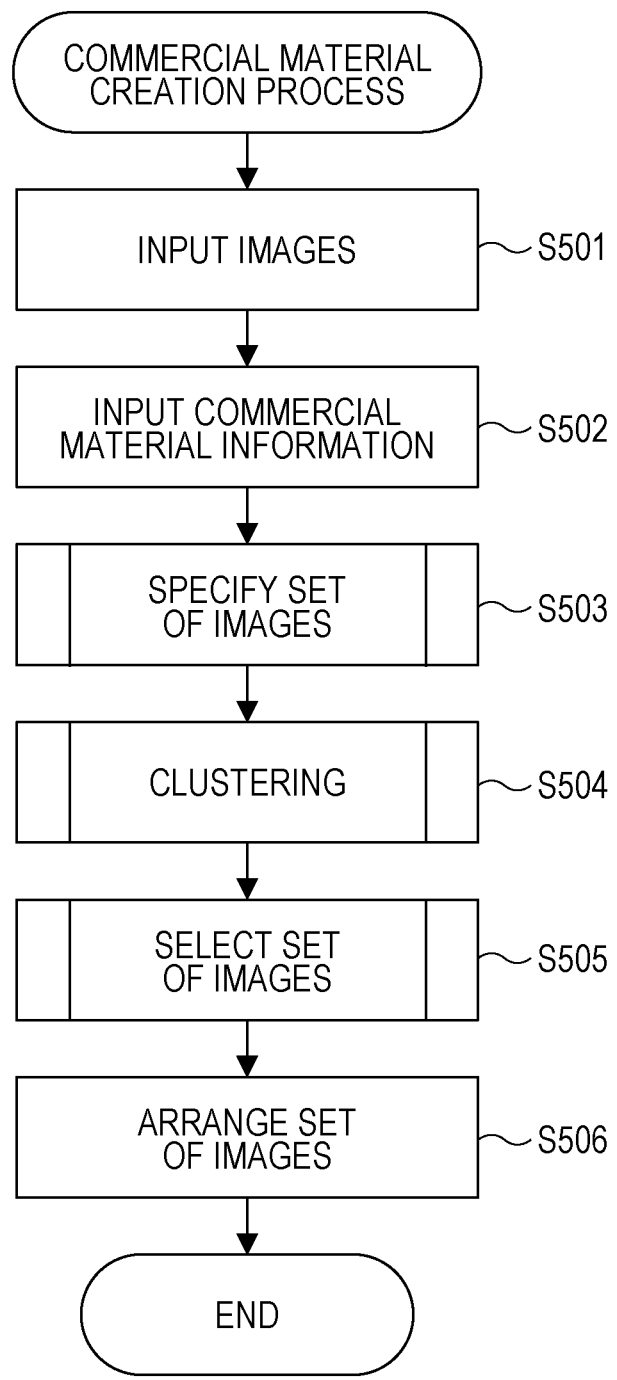
FIG. 5 is a flowchart illustrating a first example of the entire process of the commercial material creating apparatus.

FIG. 5 is a flowchart illustrating an example of the entire process of the commercial material creating apparatus 10 during creation of the commercial material.

First, in step S501, the image input unit 101 inputs images used for the commercial material. The image information acquisition unit 103 acquires image information of each input image. The image management unit 104 stores the image information, acquired by the image information acquisition unit 103, in the image information management table 30 in a mutually associated manner with the image of the acquisition source.

Next, in step S502, the commercial material information input unit 102 inputs information about the commercial material. As the information about the commercial material, for example, the number of pages and the upper limit of the number of images per page are input. The upper limit of the number of images per page is the upper limit of the number of images that can be arranged in a page.

Next, in step S503, the set specifying unit 106 specifies the set of images from among the images stored in the image management unit 104. The set specifying unit 106 applies the same set label to the images included in the specified set of images. FIG. 3B illustrates an example of the image information management table 30 after the set label is applied. Details of step S503 are described later with reference to the flowchart of FIG. 6.

Next, in step S504, the image clustering unit 107 classifies the images input in step S501 into clusters so that the number of pages of the commercial material and the number of clusters are the same. Details of step S504 are described later with reference to the flowchart of FIG. 7. While the editing unit of the commercial material is a page unit here, other editing unit, e.g., two facing pages, may be used, or a page may be divided into a plurality of editing units. In classification into clustering, the number of clusters is determined in accordance with the number of editing units.

Next, in step S505, the image selection unit 108 selects the sets of images having a common set label from each cluster generated in step S504. Details of step S505 are described later with reference to the flowchart of FIG. 9.

Next, in step S506, the image arrangement unit 109 creates the commercial material by correlating each cluster generated in step S504 with each page of the commercial material one-to-one, and arranging the images selected from each cluster on the page corresponding to the cluster. The image arrangement unit 109 may prepare in advance a greater number of templates with a plurality of layout frames in which the images are arranged, and may select a template for each page on the basis of at least any of the number of images and the content selected in step S505. Using the information about the set of images specified in step S503, the image arrangement unit 109 may collectively arrange the images included in that set of images in the same page. Since creation of a photo book is described in the present embodiment, the images is assigned to a page. If a commercial material other than a photo book (e.g., a slide show) is to be created, the image arrangement unit 109 may arrange or assign images included in a set of images to an image layout region in accordance with the type of the commercial material (i.e., one or more continuous measures). The image layout region is a paper face if the commercial material is a photo book and is a back ground image region if the commercial material is an electronic album.

Figure 6:
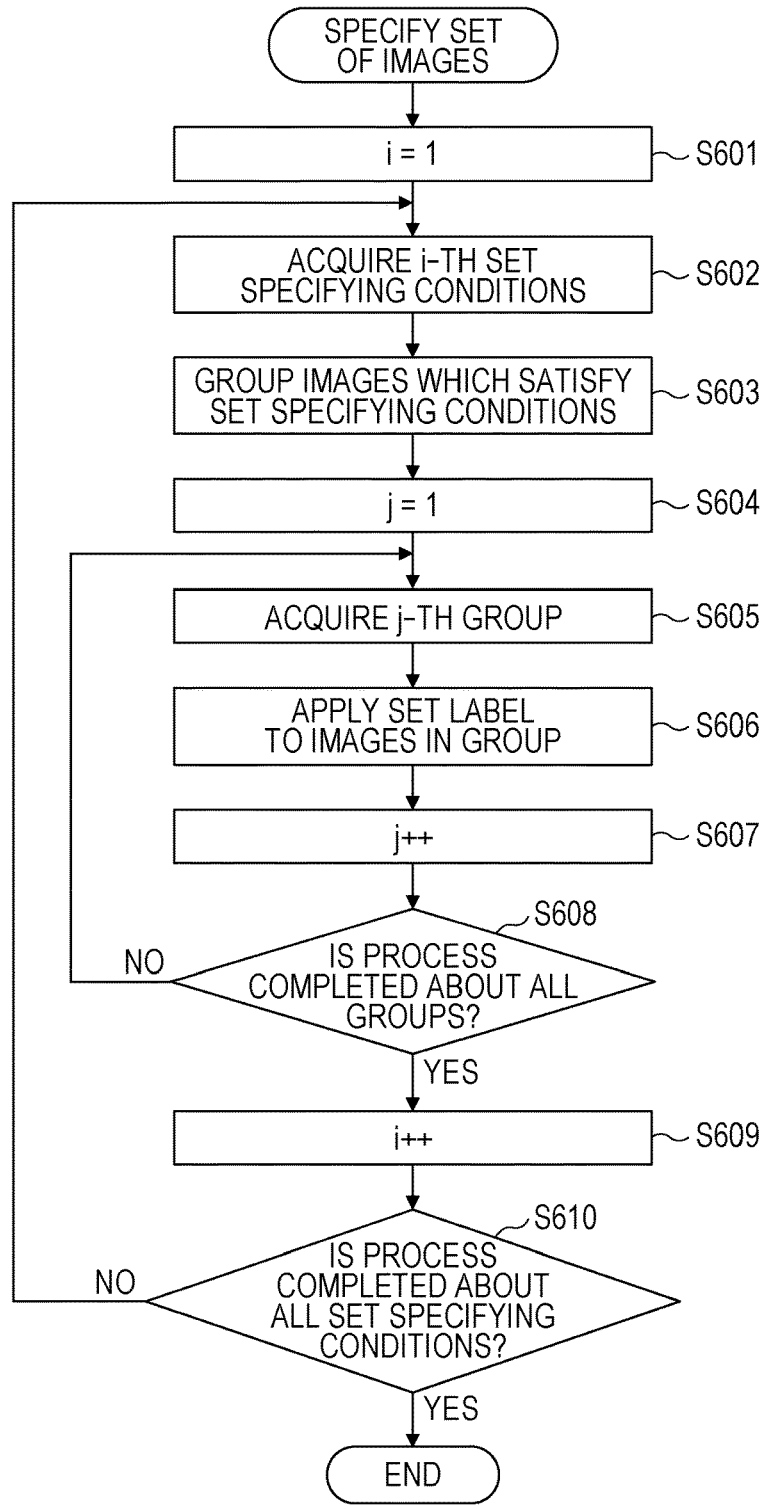
FIG. 6 is a flowchart illustrating details of step S503.

FIG. 6 is a flowchart illustrating details of step S503 of FIG. 5. As described above, in step S503, a set of images is specified from among the images input in step S501.

First, in step S601, the set specifying unit 106 sets 1 to a counter i. The counter i is used to specify set specifying conditions included in the set specifying conditions management table 40. In the present embodiment, the value of the counter i corresponds to the value of the condition ID in the set specifying conditions management table 40.

Next, in step S602, the set specifying unit 106 acquires i-th set specifying condition from the leading end of the set specifying conditions management table 40.

Next, in step S603, the set specifying unit 106 classifies images that satisfy the set specifying condition acquired in step S602 into groups. For example, if a set specifying condition 404 is acquired, the set specifying unit 106 generates groups so that images of which photographing locations are within a predetermined range, and of which similarities in color average values are equal to or above a threshold belong to the same group. A plurality of these groups may be generated. This is because, for example, there is a possibility that the set specifying condition 404 may be satisfied at each of a plurality of separate photographing locations. Here, the photographing location and the color average value are used in the set specifying condition 404. Therefore, the set specifying unit 106 acquires necessary image information with reference to a photographing location column 303 and the color average value column 304 of the image information management table 30. The set specifying condition is not limited to the set specifying condition 404 or 405 illustrated in FIG. 4, but any conditions an the basis of, for example, an attribute of an image (i.e., metadata added to an image or information acquired from an image itself) may be used.

Next, in step S604, the set specifying unit 106 sets 1 to a counter j. The counter j is used to specify the group generated in step S603.

Next, in step S605, the set specifying unit 106 acquires a j-th group from a plurality of groups generated in step S603.

Next, in step S606, the set specifying unit 106 applies the same set label to the images included in the j-th group. The set label applied here is a set label 403 corresponding to the set specifying condition 404 acquired in step S602. The same set label is stored in the set label column 301 of the rows 306, 308 and 309 of the image information management table 30. This indicates that the three images with the image IDs in the rows 306, 308 and 309 are specified as a single set.

Next, in step S607, the set specifying unit 106 increments a value of the counter j.

Next, in step S608, the set specifying unit 106 determines whether the process of step S606 is completed about all the groups generated in step S603. If it is determined that there remain unprocessed groups, the procedure returns to step S605, and steps S605 and S606 are performed for the unprocessed groups. After all the groups are processed, the procedure proceeds to step S609 and the set specifying unit 106 increments the value of the counter i.

Next, in step S610, the set specifying unit 106 determines whether the processes of steps S603 to S609 are completed about all the set specifying conditions included in the set specifying condition management table 40. If it is determined that there remain unprocessed set specifying conditions, the procedure returns to step S602, where the images which satisfies the unprocessed set specifying condition is classified into groups, and the set label is applied to the images included in each group. When the process is completed about all the set specifying conditions, the flowchart of FIG. 6 is completed and the procedure proceeds to step S504 of FIG. 5.

Figure 7:
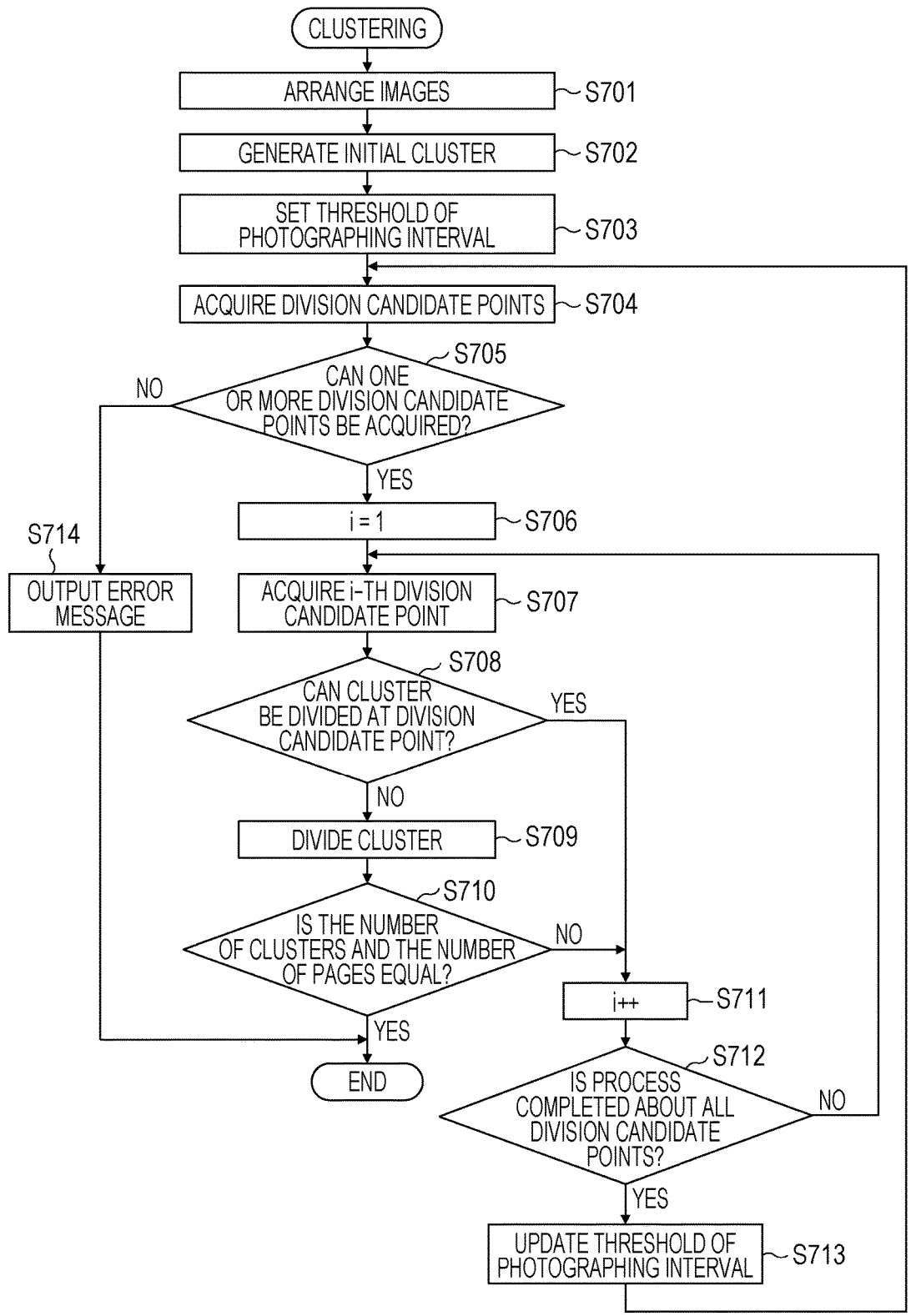
FIG. 7 is a flowchart illustrating details of step S504.

FIG. 7 is a flowchart illustrating details of step S504 of FIG. 5. As described above, in step S504, the images input in step S501 are classified into clusters so that the number of pages of the commercial material and the number of clusters are the same.

First, in step S701, the image clustering unit 107 arranges the images input in step S501 in time series (i.e., in the order of photographing date/time).

Next, in step S702, the image clustering unit 107 generates an initial cluster consisting of all the images input in step S501.

Figure 8A:
FIGS. 8A and 8B are diagrams illustrating a configuration of a cluster management table.
Figure 8B:

FIGS. 8A and 8B are diagrams illustrating an example of a configuration of a cluster management table 80. The cluster management table 80 is a table storing cluster ID, image ID 801 of the leading image of the cluster, photographing date/time 802 of the leading image of the cluster, image ID 803 of the trailing end image of the cluster, and photographing date/time 804 of the trailing end image of the cluster in a mutually associated manner. The cluster management table 80 is used to manage clusters during the process of the flowchart of FIG. 7.

Each row of the cluster management table 80 corresponds to a single cluster. When the initial cluster is generated, as illustrated, in the cluster management table 80 of FIG. 8A, only one entry is registered and all the images belong to that cluster.

In step S703, the image clustering unit 107 sets a threshold of the photographing interval. The photographing interval here is a difference in photographing date/time between a certain image and a subsequent image among images arranged in time series.

Next, in step S704, the image clustering unit 107 acquires, as a cluster division candidate point, a position between two adjoining images among images arranged in time series, and which is a position having a greater photographing interval than a threshold set in step S703. Hereafter, the "cluster division candidate point" will be referred to as a "division candidate point" as needed. Specifically, the image clustering unit 107 scans the images arranged in time series from the leading end, and acquires the position at which the photographing interval is greater than the threshold as the division candidate point.

Next, in step S705, the image clustering unit 107 determines whether one or more division candidate points have been acquired in step S704. If it is determined that no division candidate point has been acquired, the procedure proceeds to step S714. In step S714, the image clustering unit 107 outputs an error message and completes the flowchart of FIG. 7. In this case, the flowchart of FIG. 5 is completed.

If it is determined in step S705 that one or more division candidate points having been acquired, the procedure proceeds to step S706. In step S706, the image clustering unit 107 sets 1 to the counter i. The counter i is used to specify the division candidate point acquired in step S704.

Next, in step S707, the image clustering unit 107 acquires the i-th division candidate point from the division candidate point group acquired in step S704.

Next, in step S708, the image clustering unit 107 determines whether the cluster can be divided at the i-th division candidate point. Specifically, the image clustering unit 107 determines that the cluster can be divided at the i-th division candidate point in a case in which the set of images is not classified into other clusters when the cluster is divided at the i-th division candidate point. Otherwise, the image clustering unit 107 determines that the cluster cannot be divided at the i-th division candidate point.

If it is determined that the cluster can be divided at the i-th division candidate point, the procedure proceeds to step S709. In step S709, the image clustering unit 107 determines the division candidate point acquired in step S707 as a division point and divides the cluster at the division point. The cluster management table 80 of FIG. 8B represents a state of the cluster after the initial cluster is divided. The cluster management table 80 of FIG. 8B has two entries, indicating that the initial cluster is divided into two clusters: a cluster including images of image ID=1 to image ID=36 and a cluster including images of image ID=37 to image ID=75. In the example illustrated in FIG. 8B, the photographing interval between the image of image ID=36 and the image of image ID=37 is greater than a threshold and, therefore, the position between these images is the division point used in step S709.

Next, in step S710, the image clustering unit 107 determines whether the number of clusters after the division in step S709 and the number of pages of the commercial material (i.e., the photo book) are the same. If it is determined that the number of clusters and the number of pages of the commercial material are the same, the process of the flowchart of FIG. 7 is completed and the procedure proceeds to step S505 of FIG. 5.

If the number of clusters and the number of pages of the commercial material are not the same, it is necessary to further divide the cluster. Then the procedure proceeds to step S711 where the image clustering unit 107 increments the value of the counter i.

Next, in step S712, the image clustering unit 107 determines whether determination as to whether division is possible is completed about all the division candidate points acquired in step S704. If it is determined that determination as to whether division is possible is not yet completed about all the division candidate points, the procedure returns to step S707. In step S707, as described above, a new division candidate point is acquired from among the rest of the division candidate points and whether division is possible at that division candidate point is determined.

When determination as to whether division is possible is completed about all the division candidate points, the procedure proceeds to step S713. In step S713, the image clustering unit 107 lowers the threshold of the photographing interval. The procedure proceeds to step S704. In step S704, a new division candidate point group is acquired on the basis of the new threshold, whether division is possible at each division candidate point is determined, and the cluster is divided.

If it is determined in step S708 that the cluster cannot be divided at the i-th division candidate point, i.e., the set of images is classified into other clusters when the cluster is divided at the division candidate point acquired in step S707, the cluster is not divided. In this case, the procedure proceeds to step S711 described above from step S708.

Figure 9:
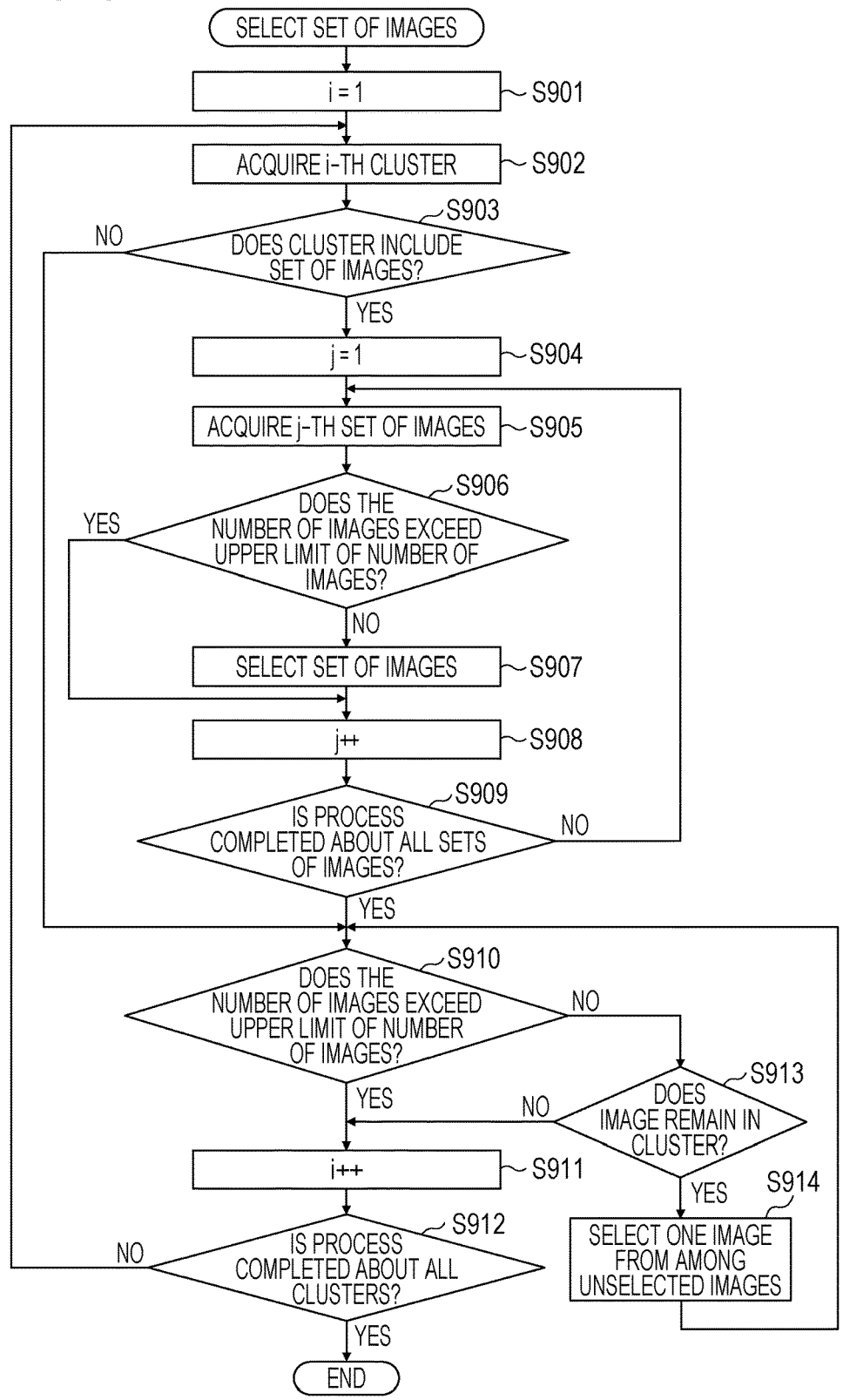
FIG. 9 is a flowchart illustrating details of step S505.

FIG. 9 is a flowchart illustrating details of step S505 of FIG. 5. As described above, in step S505, a set of images with the same set label is collectively selected from the cluster divided so that the number of pages and the number of clusters are the same.

First, in step S901, the image selection unit 108 sets 1 to the counter i. The counter i is used to specify the cluster acquired in step S504. In the present embodiment, the value of the counter i corresponds to the value of the cluster ID in the cluster management table 80 of FIGS. 8A and 8B.

Next, in step S902, the image selection unit 108 refers to the cluster management table 80 and acquires one i-th cluster from the leading end.

Next, in step S903, the image selection unit 108 determines whether a set of images is included, in the cluster acquired in step S902. To examine whether a set of images is included in the cluster, it is only necessary to refer to the set label column 301 of the image information management table 30 using the image ID of the image included in the cluster as a key. An images having the same set label corresponds to a set of images.

If it is determined that a set of images is included in the cluster, the procedure proceeds to S904 where the image selection unit 108 sets 1 to the counter j. The counter j is used to specify the set of images included in the i-th cluster.

Next, in step S905, the image selection unit 108 acquires the j-th set of images included in the cluster. The set of images included in the cluster is selected in this manner because there is a possibility that a plurality of sets of images may be included in the cluster.

Next, in step S906, the image selection unit 108 determines whether the number of images included in the j-th set of images exceeds the upper limit of the number of images per page. The upper limit of the number of images per page may be determined on the basis of the information about the commercial material acquired in step S502 of FIG. 5 or may be determined in proportion to the size of the cluster.

If it is determined that the number of images included in the j-th set of images does not exceed the upper limit of the number of images per page, the procedure proceeds to step S907. In step S907, the image selection unit 108 collectively selects the sets of images acquired in step S905. The procedure proceeds to step S908. If the number of images included in the j-th set of images exceeds the upper limit of the number of images per page, step S907 is omitted and the procedure proceeds to step S908.

In step S908, the image selection unit 108 increments the value of the counter j.

Next, in step S909, the image selection unit 108 determines whether the processes of steps S906 to S908 are completed about all the sets of images included in the i-th cluster acquired in step S902. If it is determined that the processes of steps S906 to S908 are not yet completed about all the sets of images included in the i-th cluster, the procedure returns to step S905. Regarding all the sets of images included in the i-th cluster, the processes of steps S905 to S909 are repeated until the processes of steps S906 to S908 are completed.

When the processes of steps S906 to S908 are completed about all the sets of images included in the i-th cluster as described above, the procedure proceeds to S910. In step S910, the image selection unit 108 determines whether the number of images included in the set of images selected in step S907 exceeds the upper limit of the number of images per page. If it is determined that the number of images included in the set of images does not exceed the upper limit of the number of images per page and that extra images can be selected, the procedure proceeds to step S913.

In step S913, the image selection unit 108 determines whether there remain unselected images in the i-th cluster. If it is determined that there remain unselected images, the procedure proceeds to step S914. In step S914, the image selection unit 108 selects an image from among unselected images. For example, an image with the highest evaluation value on an image may be selected. An image evaluation value may be calculated by a publicly known technique with which images of high color saturation, images in accordance with a basic composition, such as the rule of thirds, images with many persons appearing therein, images with persons with expressive faces, and the like are highly evaluated. Hereafter, "the evaluation value on an image" is referred to as an "image evaluation value" as needed.

The procedure returns to step S910. When the procedure returns from step S914 to step S910, it is determined whether the sum of the number of images included in the set of images selected in step S907 and the number of images selected in step S914 exceeds the upper limit of the number of images per page.

If it is determined in step S910 that the number of images exceeds the upper limit of the number of images per page as described above, the procedure proceeds to step S911. In step S911, the image selection unit 108 increments the value of the counter i.

Next, in step S912, the image selection unit 108 determines whether the process is completed about all the clusters registered in the cluster management table 80. If it is determined that the process is not yet completed about all the clusters, the procedure returns to step S902. The processes of steps S902 to S914 are repeated until the process is completed about all the clusters registered in the cluster management table 80.

When the process is completed about all the clusters registered in the cluster management table 80, the process of the flowchart of FIG. 9 is completed.

As described above, in the present embodiment, sets of images that satisfy the set specifying conditions are specified, and the images are classified into clusters so that the specified sets of images are maintained (after the sets of images are specified). Therefore, the editing intention of the user can be expressed by the sets of images. Further, these sets of images can be collectively arranged in the image layout region of the commercial material, whereby feeling of uniformity and plots can be provided to the commercial material.

Figure 10A:
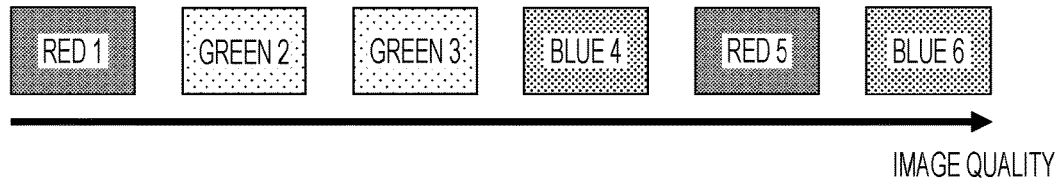
FIGS. 10A and 10B are diagrams illustrating specifying a set of images and arranging on a page.
Figure 10B:
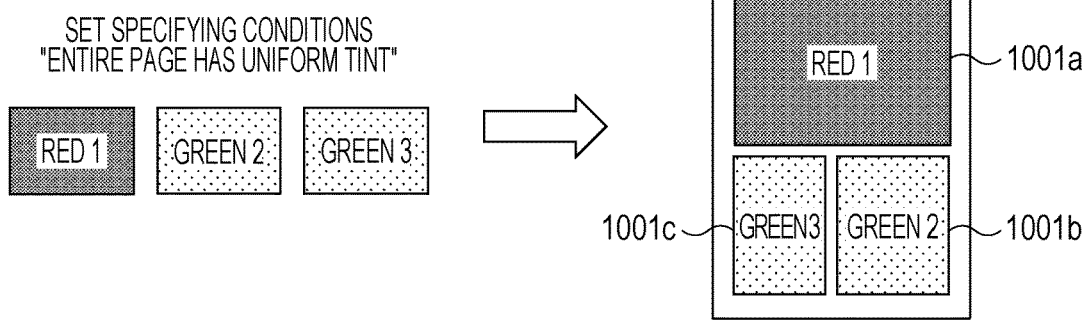

FIGS. 10A and 10B are diagrams illustrating an example of specifying a set of images on the basis of a set specifying condition, and arranging the specified set of images on a page. FIG. 10A illustrates an example of an images input in the commercial material creating apparatus 10, and FIG. 10B illustrates specifying a set of images from the images illustrated in FIG. 10A and arranging the specified set of images on a page. In the example of FIGS. 10A and 10B, the set specifying condition is "the entire page has a uniform tint," and each page has three layout frames.

In this case, the number of images to make three layout frames 1001a to 1001c have a uniform tint is insufficient in the images illustrated in FIG. 10A. In the present embodiment, if no set of images satisfying such a set specifying condition exists, specifying the set of images is given up and images to be arranged are determined on the basis of, for example, the above-described image evaluation value. As a result, by arranging the set of images in an imperfect form as in the technique described in Japanese Patent Laid-Open No. 2007-312058, lowering of quality of the entire page can be avoided.

Figure 11:
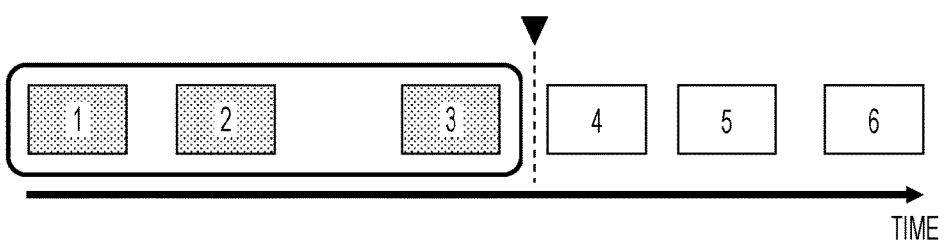
FIG. 11 is a diagram illustrating exemplary determination of a division point of a cluster.

FIG. 11 is a diagram illustrating an example after a set of images is specified in advance, arranging images input in the commercial material creating apparatus 10 in time series, and determining a division point of a cluster in accordance with the size of the photographing interval.

In the present embodiment, a set of images is specified before the images are classified into clusters. Therefore, information about the set of images when the images are classified into clusters can be used as a reference. In the technique described in Japanese Patent Laid-Open No. 2012-44646, since no information about the set of images is available when the images are classified into clusters, the division points are determined simply at the locations of large photographing intervals. Therefore, there is a possibility that a set of images intended by a user is not acquired. In the present embodiment, as illustrated in FIG. 11, a plurality of images 1 to 6 are divided not at a division point between the image 2 and the image 3 with a greater photographing interval but at a division point between the image 3 and the image 4 so that the images 1, 2 and 3 belonging to the same set of images are classified into the same cluster. In the present embodiment, division of a cluster ignoring the set of images can be prevented, and the set of images can be included in the same cluster. Therefore, the user-intended set of images can be acquired.

Second Embodiment

Next, a second embodiment is described. In the first embodiment, a commercial material is created by classifying images so that the specified set of images belongs to the same cluster, and selecting the set of images collectively from each cluster.

If, for example, the images are classified into clusters on the basis of the photographing date/time, if temporally separated set of images is to be included in the same cluster, the cluster becomes significantly large. In that case, if, for example, a cluster is assigned to one page of a photo book, there is a possibility that the number of images assigned to each page varies significantly.

In the present embodiment, when the images are classified into clusters, scores (cluster scores) for evaluating the states of the clusters after the division are derived. Since the images are classified into clusters on the basis of the cluster score, a set of images can be classified into a plurality of clusters. As described above, the present embodiment differs from the first embodiment mainly in a configuration and a process by using the scores (the cluster scores) for evaluating the states of the clusters after division. In the description of the present embodiment, the same components as those of the first embodiment will be denoted by the same reference numerals as those given in FIGS. 1 to 11 and detailed description thereof will be omitted.

Figure 12:
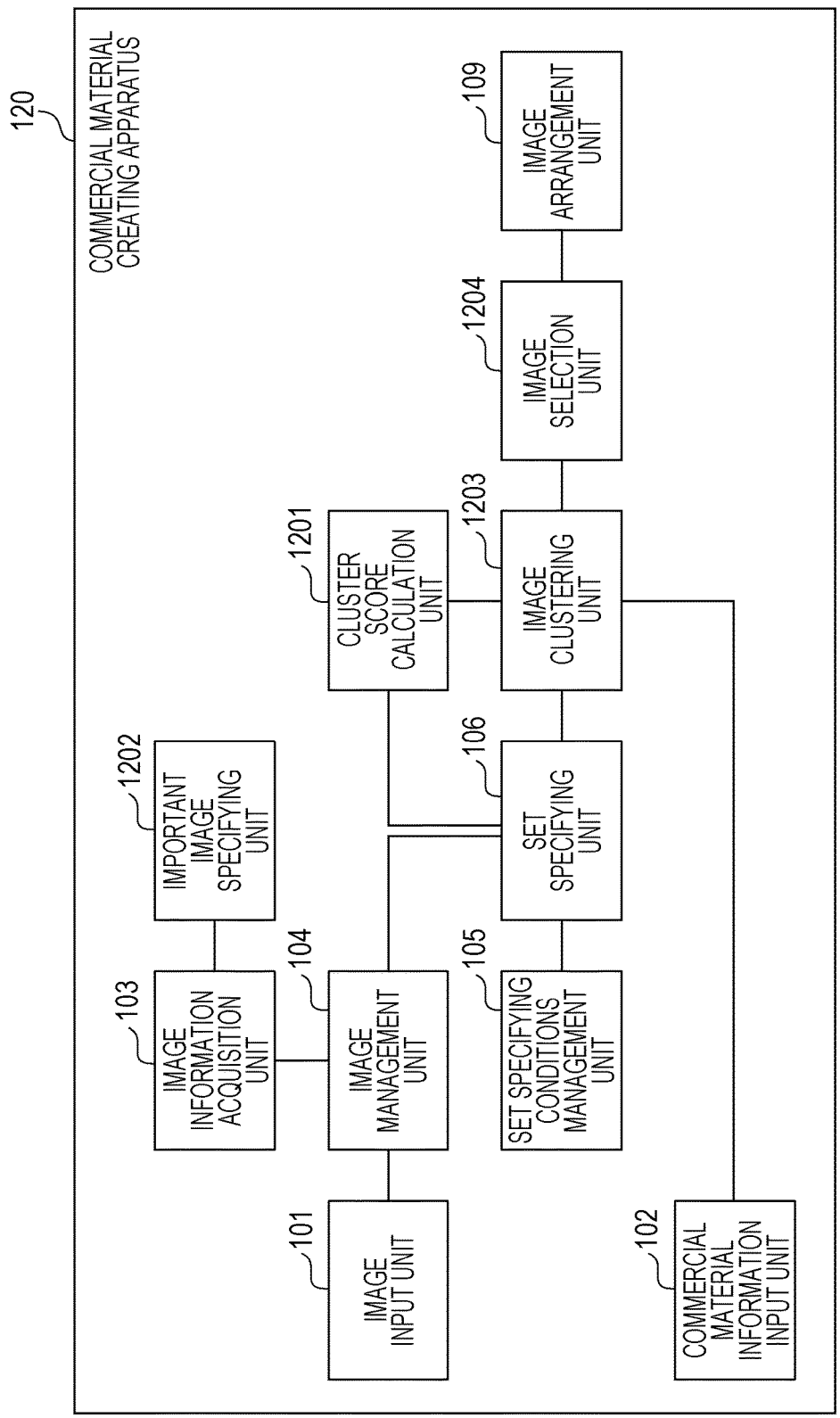
FIG. 12 is a diagram illustrating a second example of a functional configuration of a commercial material creating apparatus.

FIG. 12 is a block diagram illustrating an example of a functional configuration of a commercial material creating apparatus 120. In addition to a functional configuration of the commercial material creating apparatus 10 of the first embodiment, the commercial material creating apparatus 120 of the present embodiment includes a cluster score calculation unit 1201 which calculates a cluster score, and an important image specifying unit 1202 which specifies an important image.

The cluster score calculation unit 1201 calculates a cluster score on the basis of the number of sets of images and the number of important images included in a cluster. In the present embodiment, a cluster with a higher cluster score includes a greater number of sets of images and important images and is therefore highly evaluated. Regarding the images input in the image input unit 101, the important image specifying unit 1202 specifies, as the important image, an image with an image evaluation value exceeding a threshold as described in the first embodiment or an image designated by a user as a favorite image in advance.

FIGS. 13A to 13C are diagrams illustrating an example of a configuration of an image information management table 130. The image information management table 130 of the present embodiment includes an important image flag added to the image information management table 30 of the first embodiment. Flags indicating that certain images are important images are stored in an important image flag column 1306. In FIGS. 13A to 13C, an important flag of is applied to an important image.

Figure 14:
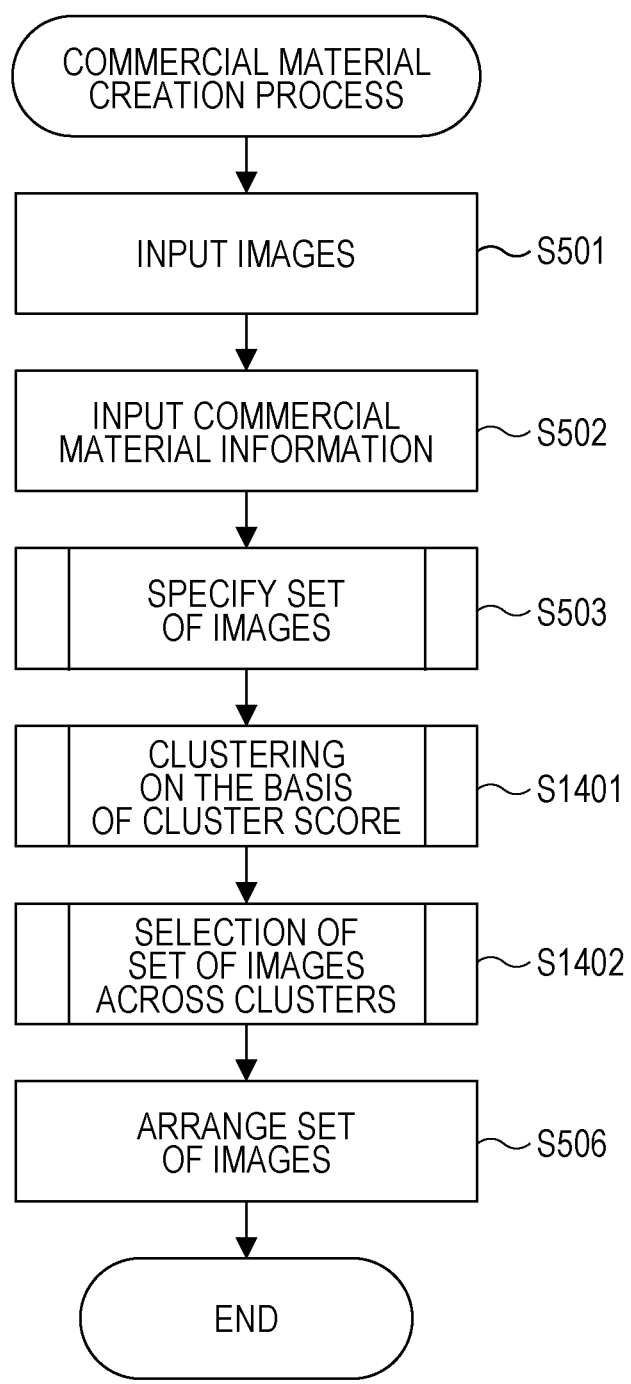
FIG. 14 is a flowchart illustrating a second example of the entire process of the commercial material creating apparatus.

FIG. 14 is a flowchart illustrating an example of the entire process of the commercial material creating apparatus 120 during creation of the commercial material.

The process of FIG. 14 differs from the process of the first embodiment (FIG. 5) mainly in that steps S1401 and S1402 are performed instead of steps S504 and S505 of FIG. 5, respectively.

In step S501 of FIG. 14, as in the first embodiment, the image input unit 101 inputs images used for the commercial material, and the image information acquisition unit 103 acquires image information about each image of the images. The image management unit 104 stores the image information in the image information management table 130 in a mutually associated manner with the image of an acquisition source. In the present embodiment, when the images used for the commercial material are input in step S501, the important image specifying unit 1202 specifies an important image among the images included in the images. When a certain image is specified as an important image, the image management unit 104 sets the important flag in the corresponding row of the important image flag column 1306 in the image information management table 130 (i.e., "1" is applied as the value of the important flag). Steps S502, S503 and S506 of FIG. 14 are the same processes as respective corresponding processes in FIG. 5.

In the present embodiment, in step S503, a case in which a set of images is specified under the set specifying conditions 404 and 405 of FIG. 4 is described as an example. The image information management table 130 of FIG. 13B illustrates a state that a set of images is specified by the process of step S503. The same set label is stored in the rows 1301, 1303 and 1304, and in the rows 1302 and 1305, respectively, of the set label column 301. The former is the set of images temporally close to each other (i.e., close in photographing date/time), and the latter is the set of images temporally separated (i.e., separated in photographing date/time). The latter set of images is classified into separate clusters in classification into clustering on the basis of the photographing date/time as in the first embodiment.

Next, in step S1401, an image clustering unit 1203 classifies the images input in step S501 into clusters on the basis of the cluster scores so that the number of pages of the commercial material and the number of clusters are the same. Details of step S1401 are described later with reference to the flowchart of FIG. 15. In the classification into clusters on the basis of the cluster score, the set of images may be included in the same cluster or may be classified into separate clusters. While the editing unit of the commercial material is a page unit here, other editing unit, e.g., two facing pages, may be used, or a page may be divided into a plurality of editing units. In classification into clustering, the number of clusters may be determined in accordance with the number of editing units. At least one of the image evaluation value, the photographing location, and the person appearing in the image described above may be used as the reference in classification into clusters.

In step S1402, an image selection unit 1204 selects a set of images. The image selection unit 1204 selects the set of images collectively in either case in which the set of images is included in the same cluster or included in separate clusters. Details of step S1402 are described later with reference to the flowcharts of FIGS. 16A and 16B.

As described above with reference to FIG. 14, the set of images selected in step S1402 is collectively arranged by the image arrangement unit 109 in the image layout region of the commercial material. The commercial material is thus created.

Figure 15:
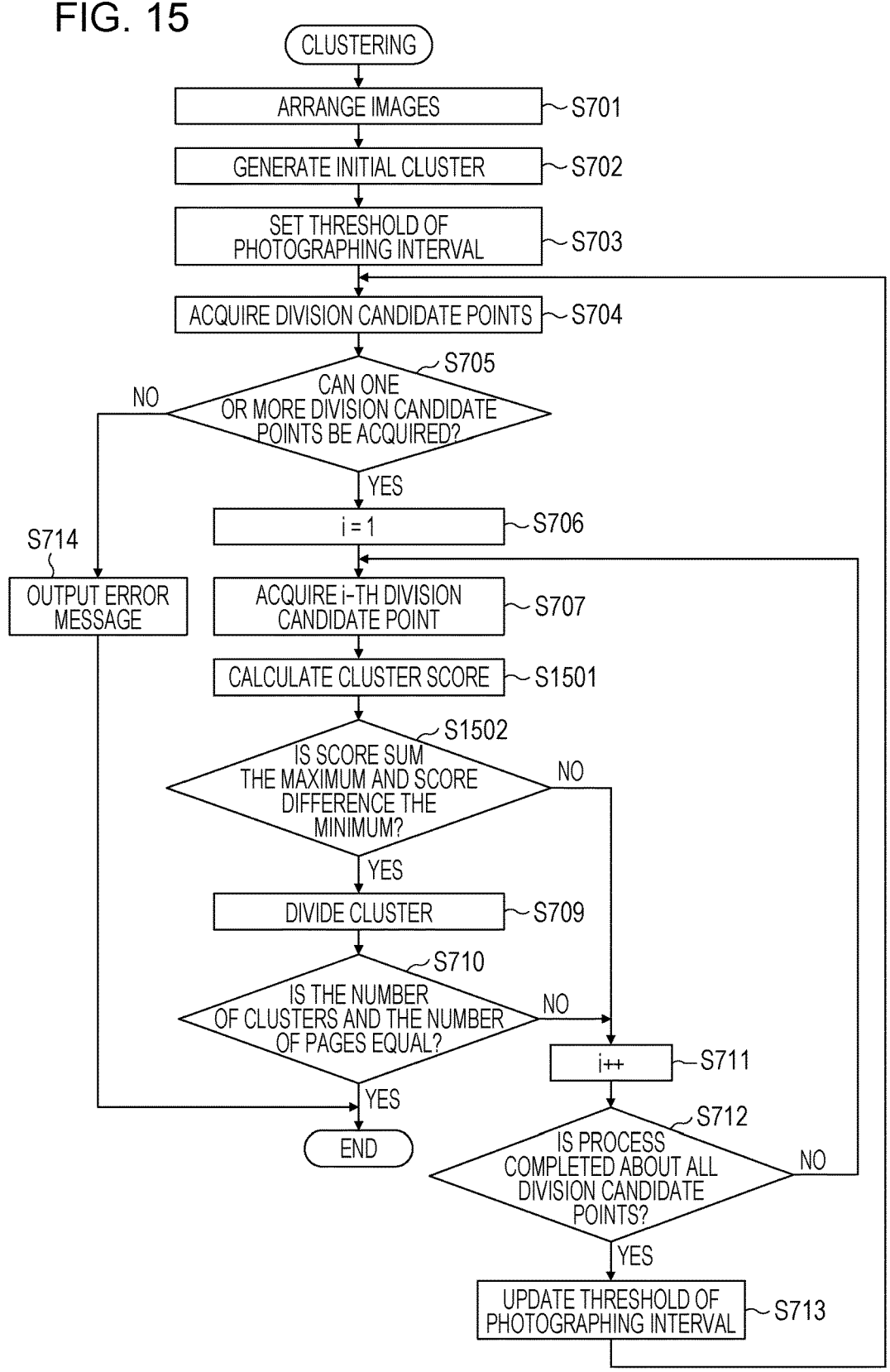
FIG. 15 is a flowchart illustrating details of step S1401.

FIG. 15 is a flowchart illustrating details of step S1401 of FIG. 14. The flowchart of FIG. 15 differs from the flowchart (step S504) of FIG. 7 described in the first embodiment in the conditions under which the cluster is divided. Specifically, step S708 in which whether the set of images is to be divided when the cluster is divided at the division candidate point is determined is replaced by step S1502 in which whether division is possible on the basis of the cluster score is determined. Step S1501 in which the cluster score is calculated is conducted immediately before step S1502.

In step S1501, the cluster score calculation unit 1201 calculates a cluster score about each of the two clusters generated by dividing a cluster at the division candidate point acquired in step S707. As described above, a higher cluster score is calculated as the number of sets of images and the number of important images included in the cluster are larger. In order to acquire the number of sets of images, the cluster score calculation unit 1201 first refers to the image information management table 130 and acquires an images (a set of images) of which images have the same set label. Next, the cluster score calculation unit 1201 counts the number of sets of images in which all the constituent images are included in the clusters that are calculation targets of the cluster scores. To examine whether all the constituent images of the set of images are included in a certain cluster, it is only necessary to refer to the cluster management table 80 using the image IDs of the images constituting the set of images as keys.

Next, in step S1502, the image clustering unit 1203 determines whether division is possible on the basis of the cluster score calculated in step S1501. The division point of the cluster is determined so that the important images exist as uniformly as possible in all the clusters, and the images constituting the set of images are included in the same cluster as much as possible. To determine such a division point, in the present embodiment, the image clustering unit 1203 selects a division point from division candidate points so that the sum of cluster scores of two clusters adjoining in the order of photographing date/time after division becomes the maximum and the difference between cluster scores of these two clusters becomes the minimum. A case in which the sum of two cluster scores adjoining in the order of photographing date/time after division becomes the maximum is, for example, a case in which a set of images is included in the same cluster. A case in which the difference between cluster scores of two clusters adjoining in the order of photographing date/time after division becomes the minimum is, for example, a case in which the important images exist as uniformly as possible in these two clusters.

The flowchart of FIG. 15 is the same as the flowchart of FIG. 7 described in the first embodiment except for the steps of determining the division point of the cluster as described above, detailed description thereof is omitted.

Figure 16A:
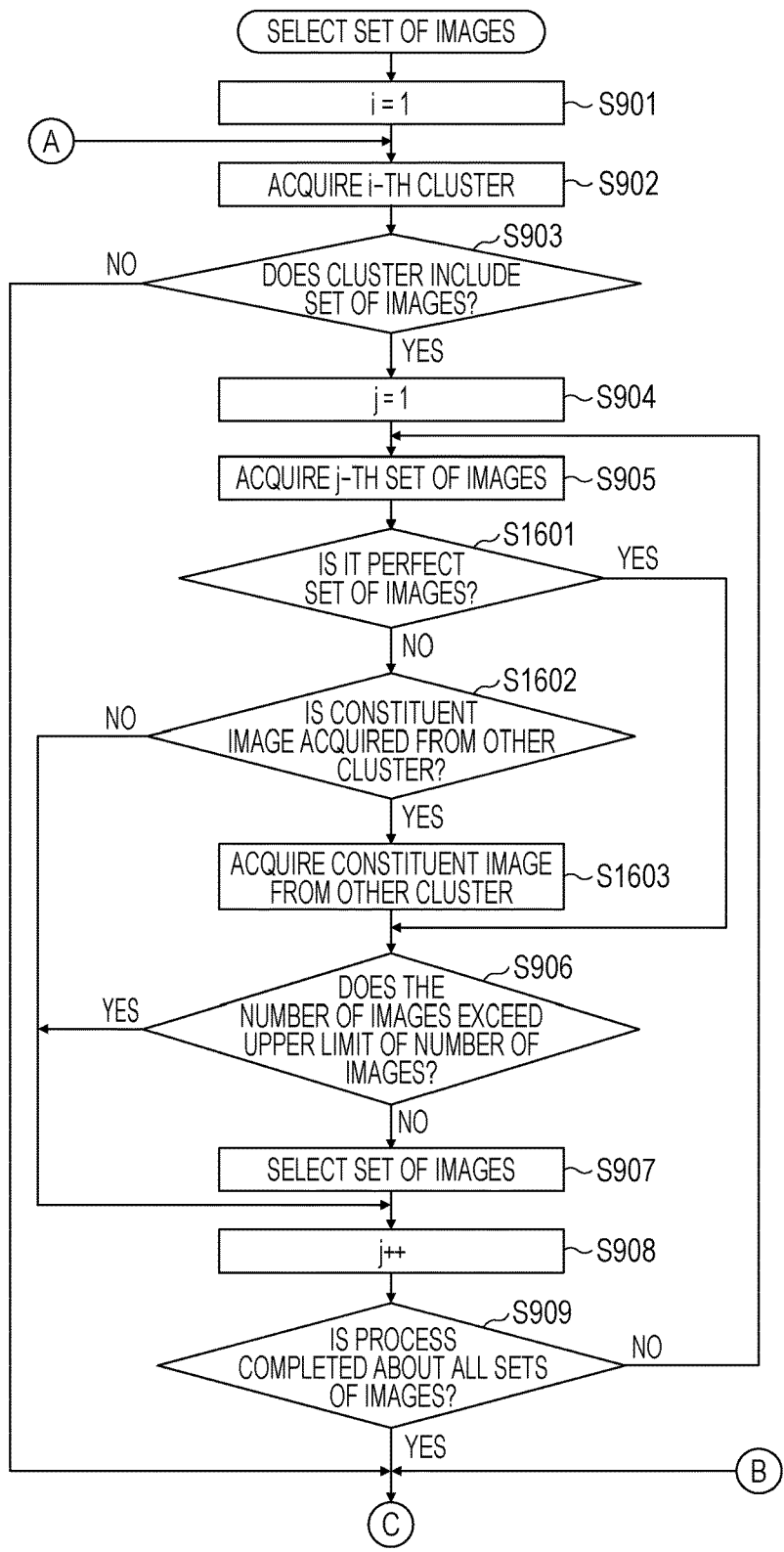
FIGS. 16A and 16B are flowcharts illustrating details of step S1402.
Figure 16B:
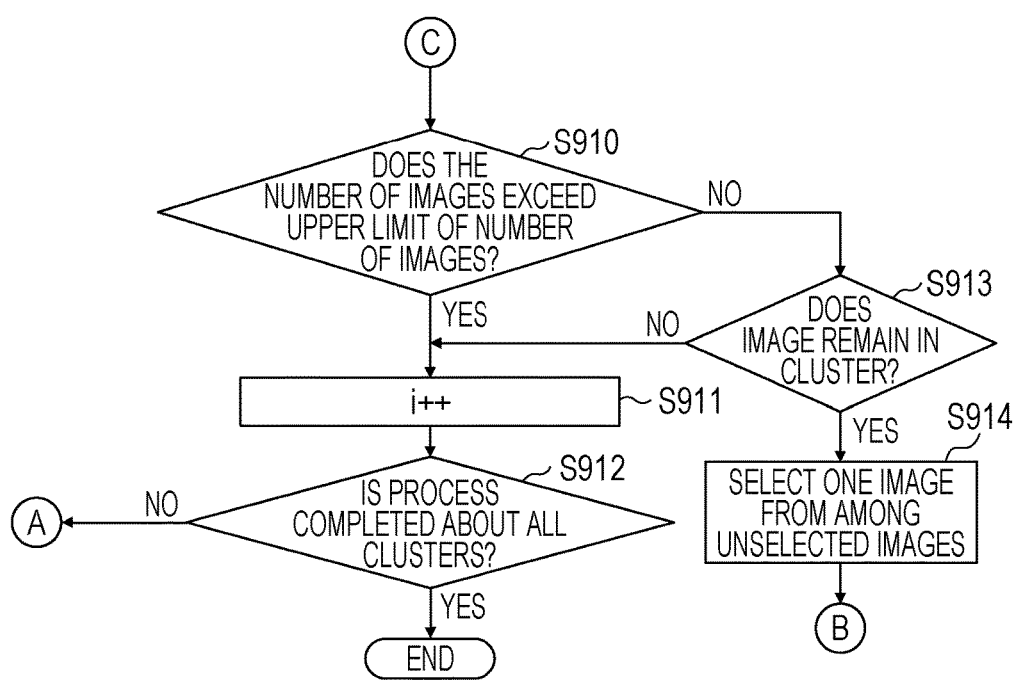

FIGS. 16A and 16B are flowcharts illustrating details of step S1402 of FIG. 14. The flowcharts of FIGS. 16A and 16B differ from the flowchart (step S505) of FIG. 9 described in the first embodiment in that the set of images is classified into separate clusters. Specifically, after step S905 in which the set of images to be included in the cluster is acquired, step S1601 in which whether all the images constituting the set of images acquired in step S905 are included in the same cluster or classified into separate clusters is determined is added. If it is determined in step S1601 that a part of the set of images is classified into separate clusters, the processes of steps S1602 and S1603 are conducted to acquire the part of the set of images from the separate clusters.

Steps S901 to S905 of FIG. 16A are the same as the corresponding processes of FIG. 9. Specifically, the clusters generated by the process of the flowchart of FIG. 15 are acquired one by one, and the following processes are performed about each set of images included in each cluster.

First, in step S1601, the image selection unit 1204 determines whether the j-th set of images acquired in step S905 is perfect. That a set of images is being perfect here means all of the images to which the same set label is applied are included in the set of images. That is, that the set of images is being perfect means that a part of the set of images is not classified into other clusters.

If it is determined that the j-th set of images acquired in step S905 is not perfect, i.e., a part of the set of images belongs to other clusters, the procedure proceeds to step S1602. Otherwise, the procedure proceeds to step S906 omitting steps S1602 and S1603.

In step S1602, the j-th set of images acquired in step S905 is not perfect, and a part exists in any cluster other than the i-th cluster. Then, in step S1602, the image selection unit 1204 determines whether the image (the constituent image) belonging to the same set as the imperfect set of images is to be acquired from the cluster other than the i-th cluster. For example, in step S503, an image with the highest image evaluation value may be determined in advance as a representative image in the set of images, and whether the representative image is included in the imperfect set of images may be used as a determination standard in step S1602. Alternatively, an image with the latest photographing date/time may be used as the representative image in the set of images. In this case, if, for example, the representative image is not included in the imperfect set of images, the constituent image may be acquired from other clusters.

If it is determined that an image (a constituent image) belonging to the same set as the imperfect set of images is to be acquired from a cluster other than the i-th cluster, the procedure proceeds to step S1603. In step S1603, the image selection unit 1204 acquires the image (the constituent image) belonging to the same set as the imperfect set of images from a cluster other than the i-th cluster. If the image (the constituent image) belonging to the same set as the imperfect set of images is not to be acquired from a cluster other than the i-th cluster, the procedure proceeds to step S908.

In step S906, the image selection unit 1204 determines whether the sum of the number of images included in the set of images acquired in step S905 and the number of images acquired in step S1603 exceeds the upper limit of the number of images per page. If the process of step S1603 is not conducted, the number of images acquired in step S1603 becomes 0 (zero).

If it is determined that the sum of the number of images included in set of images acquired in step S905 and the number of images acquired in step S1603 does not exceed the upper limit of the number of images per page, the procedure proceeds to step S907. In step S907, the image selection unit 1204 selects collectively the set of images including the image acquired in step S1603 in the set of images acquired in step S905. The procedure proceeds to step S908.

If the sum of the number of images included in the set of images acquired in step S905 and the number of images acquired in step S1603 exceeds the upper limit of the number of images per page, step S907 is omitted and the procedure proceeds to step S908.

In step S908, the image selection unit 1204 increments the value of the counter j.

Next, in step S909, the image selection unit 1204 determines whether the processes of steps S1601 to S1603 and S906 to S908 are completed about all the sets of images included in the i-th cluster acquired in step S902. If it is determined that the processes of steps S1601 to S1603 and S906 to S908 are not yet completed about all the sets of images included in the i-th cluster, the procedure returns to step S905. Retarding all the sets of images included in the i-th cluster, the processes of steps S1601 to S1603 and S906 to S909 are repeated until the processes of steps S1601 to S1603 and S906 to S908 are completed.

When the processes of steps S1601 to S1603 and S906 to S908 are completed about all the sets of images included in the i-th cluster as described above, the procedure proceeds to S910.

Subsequent processes (S910 to S914) are, when the selected number of images is less than the upper limit of the number of images per page, the processes to acquire images one by one in the descending order of height in the image evaluation value in the i-th cluster. The processes correspond to those in the processes of FIG. 9. Therefore, detailed description of the processes is omitted.

As described above, the division point at which the sum of the two cluster scores after division becomes the maximum and the difference between these cluster scores becomes the minimum is selected from the division candidate points, and the images is classified into separate clusters at the selected division point in the present embodiment. Therefore, even if temporally separated (i.e., separated in photographing date/time) sets of images are included in an images input in the commercial material creating apparatus 120, the images can be classified into clusters flexibly. Dividing images flexibly means, for example, temporally closer sets of images are made to belong to the same cluster, and temporally separated sets of images are classified into separate clusters, not to be included in the same cluster. In this manner, in addition to the effect described in the first embodiment, it is possible to prevent that the number of images assigned to each cluster varies significantly. Therefore, for example, when creating a photo book, variation of impression per page can be reduced.

Functions of the commercial material creating apparatuses 10 and 120 of the foregoing embodiments are applicable to a system consisting of a plurality of apparatuses (e.g., a host computer, an interface device, an image capturing apparatus, and a web application).

It is to be noted that the above embodiments are illustrative examples to implement the present invention and the technical scope of the present invention should not be restrictively interpreted. That is, the present invention is implementable in various forms without deviating from the technical idea or the principle features thereof.

Other Embodiments

The present invention is applicable also to a process in which a program that performs one or more functions of the above-described embodiments is supplied to a system or an apparatus via a network or a storage medium, and one or more processors in a computer of the system or the apparatus read and execute the program. Further, the present invention is implementable in a circuit having one or more functions (e.g., ASIC).

According to each of the foregoing embodiments, a set of images intended by a user can be arranged collectively in an image layout region.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-186716, filed Sep. 24, 2015, which is hereby incorporated by reference herein in its entirety.

What is claimed is:

1. An information processing apparatus comprising:
one or more processors;
memory storing instructions that, when executed by the one or more processors, cause the information processing apparatus to perform operations including:
specifying, under a predetermined condition, a set of images from among a plurality of images,
generating clusters by classifying, after the set of images is specified, the plurality of images into any of a number of clusters that is the same as a number of image layout regions, wherein the images specified as the set of images before the clusters are generated are included in the same cluster based on using information about the set of images as a reference,
collectively selecting images that constitute the set of images from among the images included in the generated clusters, and creating a material by arranging, in the image layout regions that correspond to the clusters one-to-one, the selected images constituting the set of images.

2. The information processing apparatus according to claim 1, wherein, in a case where the plurality of images are arranged in order of photographing date/time and are classified into a plurality of groups at positions between two adjoining images arranged in the order of photographing date/time as division points, and each of the plurality of groups of images are classified into the same cluster, generating includes locating the division points at a location that is other than between images constituting the set of images.

3. The information processing apparatus according to claim 1, wherein executing the instructions further causes the information processing apparatus to perform operations including deriving an evaluation value about each of a plurality of combinations of candidates of the clusters, into which at least one of the plurality of images is classified and the number of which is the same as the number of the image layout regions,
wherein generating includes generating a cluster from a combination of candidates of the plurality of clusters based on the evaluation values.

4. The information processing apparatus according to claim 3, wherein, in a case where images included in one set of images are not included in a single cluster and a first predetermined condition is satisfied, collectively selecting includes acquiring at least one of the rest of images included in the set of images from a second cluster other than the single cluster.

5. The information processing apparatus according to claim 4, wherein, in a case where the images included in the one set of images are not included in the single cluster, the image collectively selecting includes determining whether to acquire an image included in the set of images from the second cluster other than the single cluster depending on whether a predetermined representative image representing the set of images is included in the set of images.

6. The information processing apparatus according to claim 3,
wherein the candidates of the clusters with higher evaluation value are more highly evaluated, and
wherein, in a case where the plurality of images are arranged in order of photographing date/time and are classified into a plurality of groups at positions between two adjoining images arranged in the order of photographing date/time as division points, and each of the plurality of groups of images are classified into the same cluster, generating includes determining, as the same cluster, two candidates of the clusters of which sum of the evaluation values is the largest and difference between the evaluation values is the smallest from among combinations of candidates of the two clusters including any of the two images adjoins in the order of photographing date/time.

7. The information processing apparatus according to claim 3, wherein the candidates of the clusters are more highly evaluated with higher value of at least one of the number of sets of images included in the cluster generated from the combination of candidates and the number of predetermined representative images which is the number of images included in the cluster generated from the combination of candidates and represents the set of images.

8. The information processing apparatus according to claim 1, wherein, after selection of images constituting the set of images included in a single cluster is completed, if the number of images is smaller than the upper limit of the number of images that can be arranged in the image layout region, and if there are unselected images in the cluster, collectively selecting includes selecting the unselected images based on the upper limit of the number of images that can be arranged in the image layout region being the upper limit.

9. The information processing apparatus according to claim 8, wherein collectively selecting includes deriving an evaluation value of an image and selects the unselected images sequentially from an image with a higher evaluation value among the unselected images.

10. A method for an information processing apparatus, the method comprising:
specifying, under a predetermined condition, a set of images from among a plurality of images;
generating clusters by classifying, after the set of images is specified, the plurality of images into any of a number of clusters that is the same as a number of image layout regions, wherein the images specified as the set of images before the clusters are generated are included in the same cluster based on using information about the set of images as a reference;
collectively selecting images that constitute the set of images from among the images included in the generated clusters;
creating a material by arranging, in the image layout regions that correspond to the clusters one-to-one, the selected images constituting the set of images; and
transmitting the material to a user via a network.

11. A non-transitory computer readable storage medium storing a program to cause a computer to perform a method for an information processing apparatus, the method comprising:
specifying, under a predetermined condition, a set of images from among a plurality of images;
generating clusters by classifying, after the set of images is specified, the plurality of images into any of a number of clusters that is the same as a number of image layout regions, wherein the images specified as the set of images before the clusters are generated are included in the same cluster based on using information about the set of images as a reference;
collectively selecting images that constitute the set of images from among the images included in the generated clusters;
creating a material by arranging, in the image layout regions that correspond to the clusters one-to-one, the selected images constituting the set of images; and
transmitting the material to a user via a network.

12. The information processing apparatus according to claim 1,
wherein the set of images includes a first image, a second image, and a third image, and
wherein a time interval between the second image and the third image is different from a time interval between the first image and the second image.

* * * * *